United States Patent [19]

Schroeder et al.

[11] 3,746,995

[45] July 17, 1973

[54] DIGITAL DEMODULATOR FOR PHASE-MODULATED DATA TRANSMISSION SYSTEMS

[75] Inventors: Henry Charles Schroeder, East Brunswick; John Robert Sheehan, Red Bank, both of N.J.

[73] Assignee: Bell Telephone Laboratories, Incorporated, Murray Hill, N.J.

[22] Filed: Nov. 17, 1971

[21] Appl. No.: 199,694

[52] U.S. Cl. .................... 325/320, 178/67, 178/88, 325/30, 329/110, 329/126, 329/137

[51] Int. Cl. .................... H04l 27/22, H03d 3/04

[58] Field of Search .................... 178/67, 88; 324/83 D; 325/30, 38 R, 320; 329/104, 110, 126, 137

[56] References Cited

UNITED STATES PATENTS 3,401,339 9/1968 Kluever et al. .................... 325/30

3,505,470 4/1970 Gorog .................... 178/66

3,633,956 5/1972 Purdy et al. .................... 324/83 D 3,571,712 3/1971 Hellwarth et al. .................... 325/320

FOREIGN PATENTS OR APPLICATIONS 46,405 12/1962 Poland .................... 324/83 D

*Primary Examiner*—Eugene G. Botz
*Assistant Examiner*—R. Stephen Dildine, Jr.
*Attorney*—R. J. Guenther

[57] ABSTRACT

A digital demodulator for phase-modulated data transmission systems in which data are encoded as discrete phase changes between synchronous sampling instants employs a high-frequency counter with a predetermined number of counts between sampling instants. At each sampling instant the state of the counter is read out into a register in coincidence with the next occurring transition in the received signal. Thereafter, the counter is reset to a reference condition whereby at each sampling instant the state of the counter is proportional to the differential phase change between sampling instants on which the data are encoded. Parallel-to-serial conversion of the most significant counter states restores the transmitted data.

8 Claims, 7 Drawing Figures

DIGITAL DEMODULATOR FOR PHASE-MODULATED DATA TRANSMISSION SYSTEMS

BACKGROUND OF THE INVENTION

1. Field of the Invention

This invention relates to digital data transmission systems employing differential phase encoding and in particular to the demodulation of such data by digital means.

This application is being filed concurrently with application Ser. No. 199,693 by H. C. Schroeder, J. R. Sheehan and R. J. Tracey (Case 5-5-1) and entitled "Automatic Equalizer for Phase-Modulated Data Transmission Systems".

2. Description of the Prior Art

The transmission of digital data over bandlimited media such as voice-grade telephone lines by means of differentially encoded phase modulation techniques is well known in the art from U. S. Pat. Nos. 3,128,342 and 3,128,343 issued on Apr. 7, 1964 to P. A. Baker. Product modulation of differentially delayed and phase shifted received analog waveforms, as disclosed in U.S. Pat. No. 3,128,343, has been the preferred demodulation technique for phase-modulation data systems. It is difficult with this analog method to obtain an error measure of sufficient precision, for example, to control an automatic equalizer. It is also difficult to extend the analog demodulation method to phase-modulation systems of higher order than four phase.

It is an object of this invention to demodulate differentially encoded phase-modulation data signals of arbitrary order by means of digital techniques.

It is another object of this invention to provide a more economical and reliable method of demodulating differentially encoded phase-modulation data signals.

It is a further object of this invention to demodulate phase-modulated data signals as precise binary digits whose most significant bits encode transmitted data and whose remaining bits of lesser significance are an index of the departure of the measured phase angle from preselected allowable discrete phase angles.

SUMMARY OF THE INVENTION

According to this invention, a frequency counter driven by a high-speed oscillator is read out and reset to a reference condition coincident with a transition in a received phase-modulated data signal at each synchronous sampling time. The digital readout is directly proportional to the phase change between consecutive sampling instants and is readily decoded as digital data.

Sampling accuracy is enhanced by translating the received low-frequency carrier bursts to a higher intermediate-frequency level. Up modulation of the received signal wave increases the number of zero-crossing transitions from the order of two per baud or signaling interval to as many as desired. The up-modulation process leaves the relative phase of the low- and intermediate-frequency waves unaltered.

A transition detector held in step with the high-frequency oscillator is triggered by the occurrence of a data timing pulse to produce a signal indicative of the instant of occurrence and polarity of the succeeding zero-crossing transition in the received signal wave. Responsive to the occurrence of the data transition the frequency counter is gated off and its last state is read out into a storage register. As an auxiliary to the main frequency counter, a ring counter having a fixed count less than the main count is started to provide a clear period for positive readout of the main frequency counter. At the completion of the fixed count the ring counter resets the main counter to a reference state which takes account of the number of oscillator cycles skipped during readout.

Provided that the precision oscillator bears a frequency of a binary power ratio to the intermediate-frequency data waves the most significant binary states of the main frequency counter are sufficient to decode the received digital data. The remaining binary states are indicative of the direction and magnitude of the departure of the observed differential phase angle from allowable encoding phase angles, and this additional information is usable for controlling an automatic equalizer as disclosed in the above-mentioned copending application.

BRIEF DESCRIPTION OF THE DRAWING

The objects, features and advantages of this invention will be more fully appreciated from the following detailed description and the drawing in which.

DESCRIPTION OF THE PREFERRED EMBODIMENT

Figure 1:
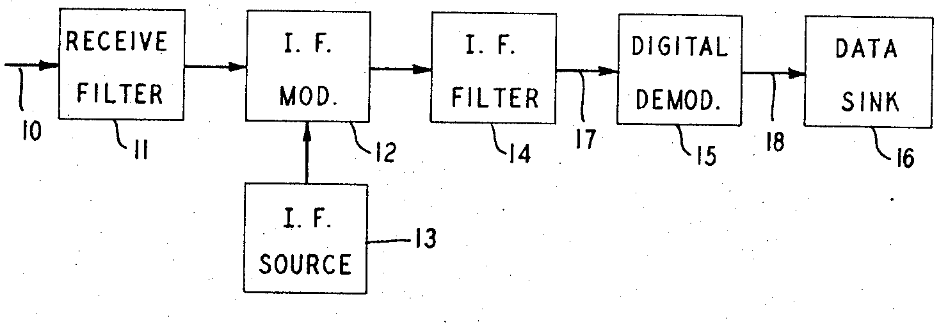
FIG. 1 is a block schematic diagram of a phase-modulation data receiver to which the principles of this invention are applicable.

FIG. 1 is a block diagram of a receiver for a differentially encoded phase-modulation data transmission system. This receiver demodulates more efficiently than heretofore, but just as reliably, differentially phase-encoded multilevel digital signals of the type described in Chapter 10 of *Data Transmission* by W. R. Bennett and J. R. Davey (McGraw-Hill Book Company 1965). Four-phase (FIG. 10-1, page 202), eight-phase (FIG. 10-2, page 202) and higher order phase signals are compatibly demodulated by the embodiment to be described.

The receiver of FIG. 1 comprises receiving filter 11, intermediate-frequency modulator 12, intermediate-frequency source 13, intermediate-frequency filter 17, digital demodulator 15 and data sink 16. The received phase-modulation signal incoming on lead 10 is typically a carrier wave at a frequency appropriate for telephone voiceband transmission, e.g., 1,800 Hz. Discrete phases of this carrier wave are employed from one signaling interval to the other to encode digital data by means of their differences. Receiving filter 11 defines the signal passband and screens out-of-band noise from the remainder of the receiver. Inasmuch as the baud or symbol rate, e.g., 1200, 1600 and 2000, is comparable to the carrier frequency, there are fewer than two cycles per baud available for encoding.

The precision with which phase changes between bauds can be determined is enhanced by translating the received carrier wave upward in frequency to increase the number of cycles per baud available for comparison of phase differences. An up-modulation factor of nine has been found to work well in practice. Thus, a local carrier wave of frequency $f_{LC}$ = 14.4 kHz, generated in block 13, up modulates a carrier wave of 1800 Hz to 16.2 kHz in modulator 12. The lower sideband at 12.6 kHz resulting from the modulation process is suppressed in filter 14. There are now available nine times as many zero-crossing transitions per baud so that an accurate phase sample can be taken digitally near the center of each baud.

Digital demodulator 15 determines and encodes according to this invention, changes in phase from baud to baud as multidigit binary numbers and delivers these readily storable numbers to data sink 16. By a simple parallel-to-serial conversion the most significant bits can be transformed into digital data.

Figure 2A:
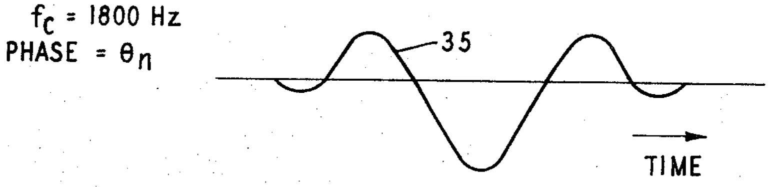
FIGS. 2*a* and 2*b* are waveform diagrams covering one signaling interval of low-frequency and intermediate-frequency waves, respectively, whose phase changes between signaling intervals encode digital data.

FIG. 2*a* represents one and a half cycles of a carrier wave 35 at the exemplary frequency $f_c$ = 1800 Hz and arbitrary phase $\theta_n$ encoding digital data at a baud rate of 1200 Hz. The general shaping is that of a raised cosine wave. The phase is ideally held substantially constant at least during the sampling interval.

Figure 2B:
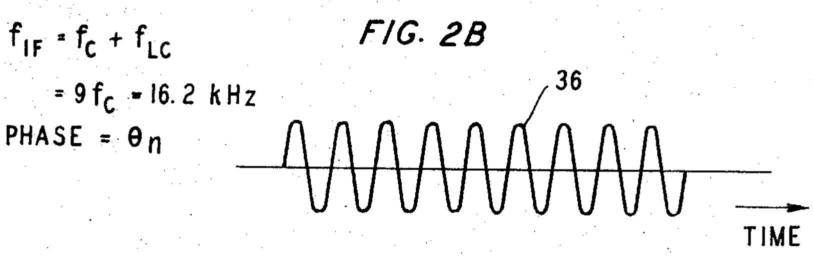

FIG. 2*b* represents the same baud interval of carrier wave up modulated to the exemplary intermediate frequency $F_{IF}$ = 16.2 kHz = $9f_c$. Wave 36 preserves the same phase $\theta_n$ as the carrier wave $f_c$ in FIG. 2a.

Figure 3A:
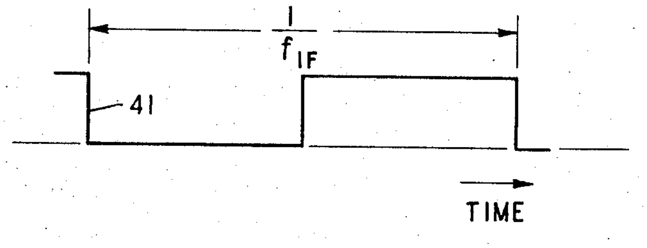
FIGS. 3a and 3b are waveform diagrams of a single cycle of the intermediate frequency wave and a composite analog representation of the binary readout of the main frequency counter used in the practice of this invention.
Figure 3B:
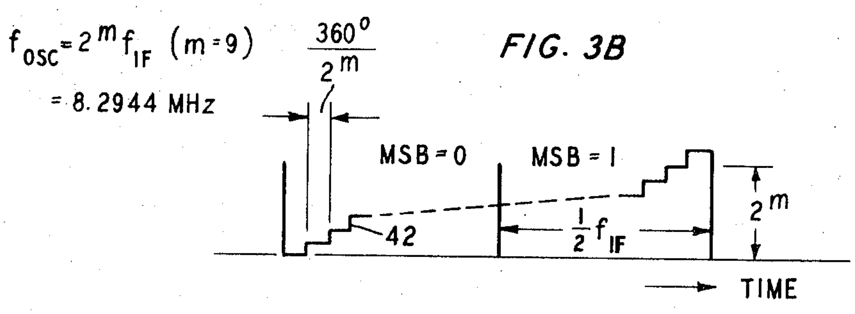

FIG. 3a represents a single cycle 41 taken near the sampling point of the intermediate-frequency wave 36 of FIG. 2*b* after squaring. In order to facilitate the practice of this invention the single cycle 41 of FIG. 3*a* is divided into a large number of increments, such as $2^9$ = 512. This large number of increments can be realized as the parallel readout of a nine-stage frequency counter driven by a wave at a frequency of $f_{osc}$ = 8.2944 MHz. This readout is diagrammed as the staircase wave 42 in FIG. 3*b*. There are 512 steps which divide 360° of phase into as many increments.

Figure 4:
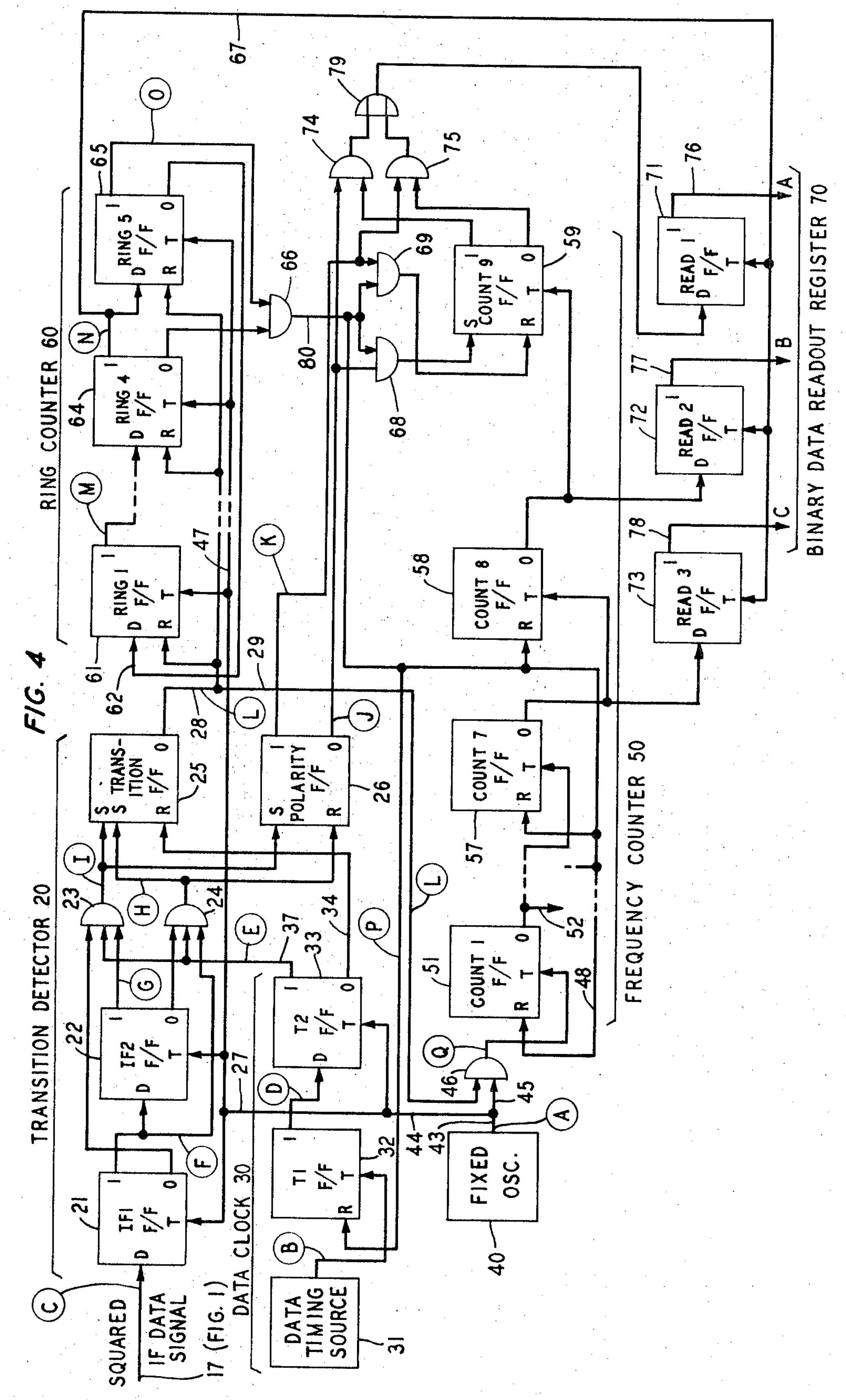
FIG. 4 is a block schematic diagram of an illustrative embodiment of a digital demodulator for a phase-modulated digital data transmission system according to this invention.

FIG. 4 is a block schematic diagram of a preferred embodiment of the digital demodulator of this invention. The digital demodulator comprises broadly a transition detector 20, a data clock 30, a fixed oscillator 40, a frequency counter 50, a ring counter 60 and a readout register 70.

Each of the enumerated functional elements of the digital demodulator includes one or more bistable flip-flops having various inputs and outputs. The respective inputs and outputs required for a given flip-flop are identified as follows: T is the toggle input which when activated alone complements the existing output from 1 to 0 or vice versa; D is the data input which operates in conjunction with a T input to generate a corresponding output, e.g., if D is 1, the output becomes 1 as soon as T is activated; S is the set input which operates independently of the T input to activate the 1 output (more than one S input may be present on a given flip-flop); and R is the reset input which operates independently of the T input to activate the 0 output.

Figure 5:
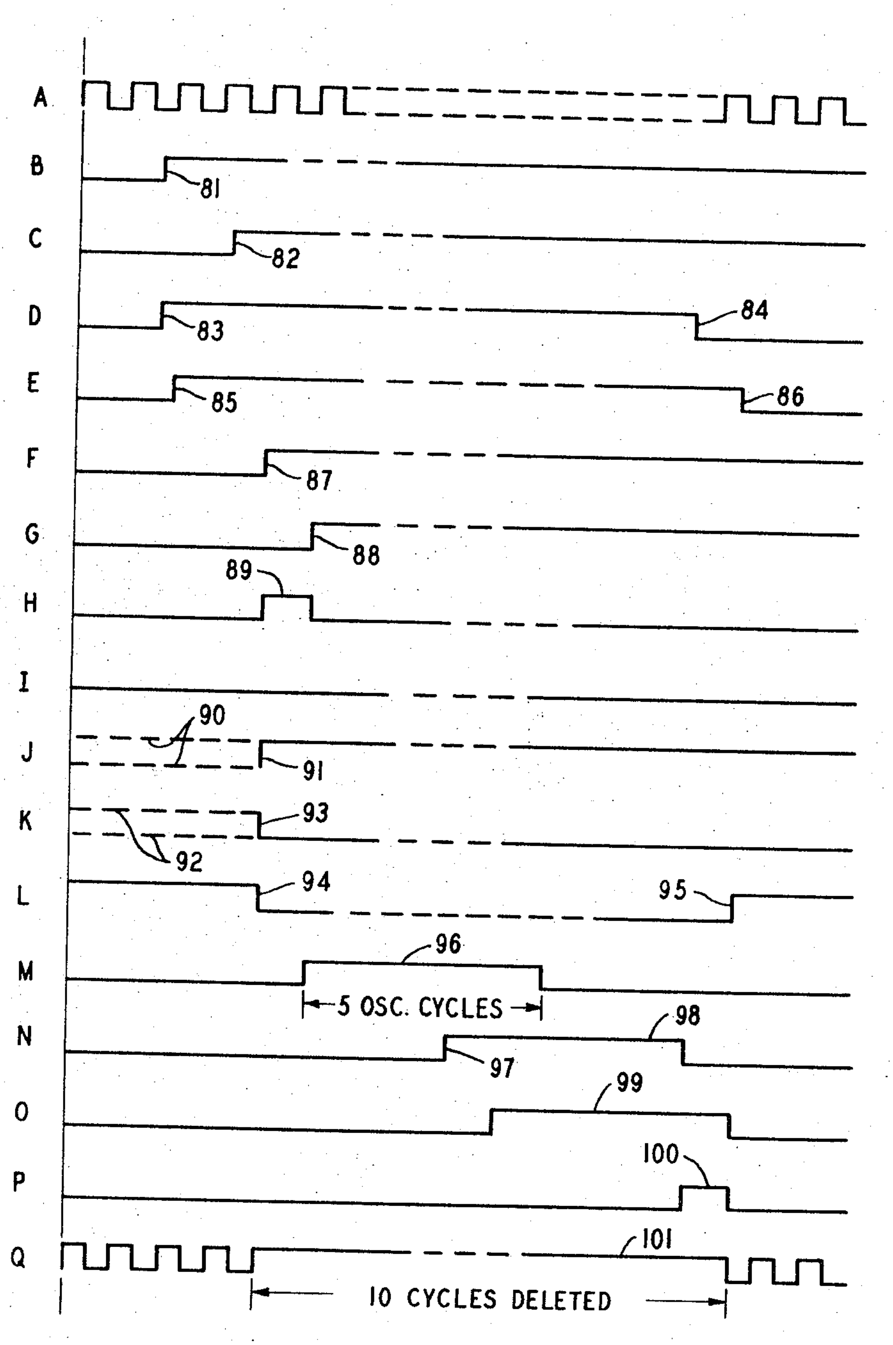
FIG. 5 is a waveform chart useful in explaining the operation of the illustrative embodiment of FIG. 4.

The encircled letters appearing on FIG. 4 are keyed to the waveform diagram of FIG. 5.

Transition detector 20 further comprises i-f flip-flops 21 and 22, transition flip-flop 25, polarity flip-flop 26 and AND-gates 23 and 24. AND-gates 68 and 69 are controlled by flip-flop 26.

Data clock 30 comprises timing source 31 and timing flip-flops 32 and 33. Data clock 30 is synchronized conventionally with the incoming carrier wave to the baud rate.

Fixed oscillator 40 is a free-running precision oscillator whose frequency is set substantially to 512 times the intermediate frequency.

Frequency counter 50 comprises the appropriate number of binary counter stages or flip-flops to effect the desired count. In this case there are nine stages, 51 through 59 designed to produce the overall count of $2^9$ = 512. (Only stages 51 and 57 through 59 are shown in FIG. 4 to avoid cluttering the drawing.)

Ring counter 60 comprises a chain of flip-flops 61 through 65 (of which flip-flops 61, 64 and 65 are shown explicitly). All of these flip-flops are toggled by the output of fixed oscillator 40. Ring counter 60 produces a toggling output on lead 67 on its fourth count and a reset output on lead 80 by way of AND-gate 66 between the fourth and fifth counts.

Binary data readout register 70 comprises a number of flip-flops operating from the outputs of the terminal stages of frequency counter 50, depending on the number of data bits encoded per level. Here three flip-flops 76 through 78 are shown to correspond with three-level eight-phase data encoding.

The operation of the demodulator of FIG. 4 is conveniently explained in conjunction with the waveform diagrams of FIG. 5. Fixed oscillator 40 runs continuously at an exemplary frequency of 8.2944 MHz to produce a square-wave output as shown on line (A) of FIG. 5. This wave is applied by way of leads 43 and 44 to the T input of timing flip-flop 33, by way of leads 43, 44 and 27 to the T inputs of i-f flip-flops 21 and 22 and by way of leads 43 and 45 to AND-gate 46, whose output drives frequency counter 50.

Timing source 31 produces a square-wave output at the exemplary baud frequency of 1200 Hz as suggested on line (B) of FIG. 5. The time scale selected is such as to show only a single positive-going transition 81. This square wave drives timing flip-flops 32 and 33 in tandem to produce the waveform (D) with positive-going transition 83 coincident with transition 81 at the output of flip-flop 32 and transition 85 of waveform (E) coincident with the next positive-going transition of waveform (A) from oscillator 40 at the output of flip-flop 33. The positive state of waveform (E) on lead 37 enables AND-gates 23 and 24 associated with the outputs of i-f flip-flop 21 and 22.

The *i–f* signal on lead 17 from the output of *i–f* filter 14 in FIG. 1 is assumed to have been squared by conventional means not shown. Waveform (C) represents the *i–f* wave and at the time of interest a positive transition 82 occurs. Prior to the transition the outputs of both flip-flops 21 and 22 were at 0 as shown in waveforms (F) and (G) of FIG. 5. Hence, AND-gates 23 and 24 connected to the outputs of flip-flops 21 and 22 as shown exhibited no significant output. On the first positive transition of waveform (A) following transition 82 in data waveform (C) a 1 output appears at flip-flop 21 as shown in transition 87 of waveform (F) and at the next positive transition in waveform (A) a 1 output also appears at flip-flop 22 as shown in transition 88 of waveform (G). The combined states of flip-flops 21 and 22 produce a pulse 89 in the output of AND-gate 24 as shown in waveform (H) to indicate the occurrence of positive transition in the *i–f* wave. Waveform (H) is applied to an S input on transition flip-flop 25 and an R input on polarity flip-flop 26.

AND-gate 23 produces no change in its output as shown on waveform (I) on the occurrence of a positive-going i-f transition. A negative-going *i–f* transition would have activated AND-gate 23 and transition register 26 in a similar manner.

Upon the setting of transition flip-flop 25 the 0 output on lead 28 is deactivated to produce a negative-going transition 94 on waveform (L), thereby removing the reset input from all stages of ring counter 60, which has been in the all-zero condition. The 0 output of flip-flop 25, also appearing on lead 29, disables AND-gate 46, thereby freezing the count standing in frequency counter 50. The count input to frequency counter 50 shown as waveform (Q) in FIG. 5 is seen to be interrupted coincident with transition 94 in waveform (L). Ring counter 60, toggled by the output of fixed oscillator 40 over leads 43, 44 and 47 begins an upward count due to the feedback connection over lead 62 between the 0 output of final stage 65 and the D input of first stage 61. Waveforms (M), (N) and (O) indicate the outputs of stages 61, 64 and 65 of ring counter 60. The respective 0 and 1 outputs of stages 64 and 65 are combined in AND-gate 66 to produce a reset signal 100 on the tenth count (based on the use of a five-stage ring counter) on lead 80, as shown in waveform (P) of FIG. 5. This reset signal is applied to the R input of timing flip-flop 32 to cause negative transition 84 in waveform (D). Transition 84 is propagated to timing flip-flop 33 to cause a positive transition on lead 34 thereby resetting transition flip-flop 25 and terminating the count in ring counter 60. The reset signal is also applied to reset line 48 to restore the frequency counter to a reference condition. In order to compensate for the ten counts of ring counter 60 during which the count input to frequency counter 60 is interrupted, the second and fourth stages from the left (not explicitly shown) are set while the remaining stages (except for the final stage, which is controlled specially) are reset. With 1s in stages two and four the count stands at 10.

On the fourth count of ring counter 60 the 1 output of stage 64 is activated as indicated by positive transition 97 in waveform (N). A readout signal is then produced on lead 67 connected to the 1 output of the next to last stage 64 of ring counter 60. The readout signal toggles the cells 71 through 73 of readout register 70. The D inputs of these cells are connected as shown in FIG. 4 to the last three stages 57, 58 and 59 of frequency counter 50. Accordingly, the most significant bits in frequency counter 50 are transferred to register 70 before the counter is reset to its reference condition.

As explained more fully in the cited copending patent application in connection with the binary readout table of FIG. 6 therein, the binary states of the several stages of frequency counter 50 directly encode phase angles. Thus, the state of terminal stage 59 corresponds to 0 and 180° of phase shift; the state of the next to the last stage, to plus and minus 90°; and the third last to plus and minus 45 degrees. The remaining stages correspond to successive halvings of the mentioned angles down to fractions of a degree. Accordingly, the last two bits are sufficient for encoding four-phase data signals; the last three, for encoding eight-phase signals; and so forth.

It will be observed that the output of terminal stage 59 of frequency counter 50 is connected to register stage 71 through an array of AND-gates and an OR-gate. This is for the purpose of avoiding a phase ambiguity in the binary angle readout due to the relative polarities of consecutive transitions in the received signal wave. This ambiguity is overcome by reason of polarity flip-flop 26 and the logic circuitry it controls. The respective 0 and 1 outputs of polarity flip-flop 26, as shown on waveforms (J) and (K) of FIG. 5, correspond to positive-going and negative-going transitions in the received or *i–f* signal wave at the data timing instant. The prior state of flip-flop 26 may be either positive or negative as indicated by dotted portions 90 and 92 of the waveforms. On the occurrence of a positive transition as in this example, the 0 output goes positive, as shown at instant 91 on waveform (J). The outputs of flip-flop 26 control AND-gates 68, 69, 74 and 75. With regard to gates 74 and 75 the former is enabled on a positive transition of the received signal and the latter, otherwise. Thus, the 1 or 0 output of the final stage 59 of counter 50 is delivered to register stage 71 through OR-gate 79 depending on the polarity of the signal transition.

Gates 68 and 69 are enabled by the later occurring reset pulse on lead 80 at the time frequency counter 50 is restored to the reference condition. The most significant bit of the reference condition is set to the 1 state for a positive signal transition to conform to FIG. 3 (*b*) and to the 0 state for a negative signal transition. Thus, the state of the counter 50 is maintained proportional to the instantaneous signal phase at all sampling times.

It is to be understood that the readout from less significant stages, as is suggested by arrow 52 at the output of stage 51, can be used for more precise identification of the differential phase angle (storing the three most significant bits yields the angle only to the nearest 22.5°) and hence would be useful in demodulating analog signals, as well as providing error information for control of an adaptive equalizer associated with the overall receiver.

While this invention has been disclosed in terms of a particular illustrative embodiment, it will be apparent to those skilled in the art that various modifications and improvements may be made without departing from the spirit and scope of the invention.

What is claimed is:

1. In a synchronous differentially coherent phase-modulation data transmission system a demodulator at the receiver therefor comprising means for detecting transitions in a received signaling wave whose changes in phase between synchronous signaling intervals encode data, a high-frequency counter whose full count is coextensive with one cycle of said signaling wave, means responsive to said transition detecting means for resetting said counter to a reference condition at a predetermined portion of each signaling interval, and means for reading out the state of said counter just prior to the operation of said resetting means as a measure of the phase change in said signaling wave between signaling intervals.

2. The demodulator defined in claim 1 in combination with means for translating said received signaling wave to a relatively high intermediate frequency to provide a plurality of zero-crossing transitions for each signaling interval.

3. The demodulator defined in claim 1 and means for interrupting the operation of said counter prior to resetting for a preselected interval to facilitate readout.

4. The demodulator defined in claim 1 in which said counter comprises a precision oscillator of fixed frequency harmonically related by an integral power of two to the frequency of said signaling wave and a multistage binary frequency divider in tandem with said oscillator.

5. The demodulator defined in claim 1 in which said resetting means discriminates between positive- and negative-going transitions in said signaling wave and inverts the most significant output of said counter upon readout responsive to a preselected transition polarity.

6. In a data transmission system which encodes digital data as discrete phase differences between successive signaling intervals of a carrier wave, a receiver comprising means for translating said carrier wave to an intermediate-frequency wave providing a plurality of zero-crossing transitions for each signaling interval;

means for detecting the instant of occurrence and polarity of zero-crossing transitions in said intermediate-frequency wave at a preselected sampling time within each signaling interval;

means for generating a high-frequency wave whose frequency is harmonically related to said intermediate frequency by a power of two;

a binary counter having a plurality of stages each capable of assuming a first and second state, the condition of the terminal stage of said counter corresponding to inversions of said phase differences;

means normally gating said generating means to said binary counter;

means operative at said sampling times to disable said gating means for a predetermined interval;

register means capable of storing the states of a plurality of stages of said binary counter;

means operative at said sampling times and responsive to the polarity of the transition in said intermediate-frequency wave for transferring the actual condition or the binary complement thereof from said binary counter to said register means; and means operative at said sampling times to reset said counter to a reference condition and to enable said gating means.

7. In a synchronous differentially coherent phase-modulation data transmission system the method of demodulating the received data signal wave comprising the steps of detecting transitions in said received data signal wave whose changes in phase between signaling intervals encode data, continuously generating a repetitive counting sequence whose length is coextensive with one cycle of said signal wave, interrupting said counting sequence at a predetermined portion of each signaling interval, recording the state of said counting sequence immediately following said interruption, and resetting said counting sequence to a reference condition at the termination of said predetermined portion of each signaling interval.

8. The method of claim 7 including a further preliminary step of translating the frequency of the baseband wave on which data signals were originally encoded to a higher intermediate frequency to increase substantially the numbers of transitions for each signaling interval in said data signal wave.

* * * * *